US008987962B2

(12) United States Patent
Kim (10) Patent No.: US 8,987,962 B2
(45) Date of Patent: Mar. 24, 2015

(54) DOUBLE-STATOR/DOUBLE-ROTOR TYPE MOTOR AND DIRECT DRIVE APPARATUS FOR WASHER USING SAME

(75) Inventor: Byoung Soo Kim, Anyang-si (KR)

(73) Assignee: Amotech Co., Ltd. (KR)

( * ) Notice: Subject to any disclaimer, the term of this patent is extended or adjusted under 35 U.S.C. 154(b) by 175 days.

(21) Appl. No.: 13/805,924

(22) PCT Filed: Jun. 14, 2011

(86) PCT No.: PCT/KR2011/004343
§ 371 (c)(1),
(2), (4) Date: Dec. 20, 2012

(87) PCT Pub. No.: WO2011/162501
PCT Pub. Date: Dec. 29, 2011

(65) Prior Publication Data
US 2013/0093276 A1    Apr. 18, 2013

(30) Foreign Application Priority Data

Jun. 23, 2010   (KR) .................. 10-2010-0059533

(51) Int. Cl.
*H02K 16/00*   (2006.01)
*H02K 16/02*   (2006.01)
*H02K 21/16*   (2006.01)
*H02K 21/22*   (2006.01)

(52) U.S. Cl.
CPC .............. *H02K 16/00* (2013.01); *H02K 21/16* (2013.01); *H02K 21/22* (2013.01)
USPC ........................................ 310/112; 310/114

(58) Field of Classification Search
USPC ................................. 310/112–114
See application file for complete search history.

(56) References Cited

U.S. PATENT DOCUMENTS

| 5,783,893 | A | 7/1998 | Dade et al. | |
|---|---|---|---|---|
| 6,924,574 | B2 * | 8/2005 | Qu et al. | 310/114 |
| 7,030,528 | B2 * | 4/2006 | Morgante | 310/112 |
| 7,154,193 | B2 * | 12/2006 | Jansen et al. | 290/55 |
| 7,911,110 | B2 * | 3/2011 | Choi et al. | 310/266 |
| 2009/0091204 | A1 * | 4/2009 | Koshiba et al. | 310/114 |

FOREIGN PATENT DOCUMENTS

| JP | 60219945 | 11/1985 |
|---|---|---|
| KR | 1020030050734 | 6/2003 |
| KR | 1020040002349 | 1/2004 |
| KR | 1020060085414 | 7/2006 |
| KR | 100663641 | 12/2006 |
| KR | 1020080000666 | 1/2008 |
| KR | 1020080030667 | 4/2008 |
| KR | 1020080094274 | 10/2008 |

OTHER PUBLICATIONS

International Search Report—PCT/KR2011/004343 dated Feb. 6, 2012.

* cited by examiner

*Primary Examiner* — Dang Le
(74) *Attorney, Agent, or Firm* — Cantor Colburn LLP

(57) ABSTRACT

Provided are a double-stator/double-rotor type motor, and a direct drive apparatus for a washing machine using the double-stator/double-rotor type motor, in which a nonmagnetic material is provided between inner and outer stators so as to form dual magnetic circuits that are respectively separated for an inner rotor and an outer rotor, and a double stator is disposed between an inner rotor and an outer rotor so as to separably form a magnetic circuit with a shortened magnetic.

6 Claims, 6 Drawing Sheets

FIG. 1

PRIOR ART

DOUBLE-STATOR/DOUBLE-ROTOR TYPE MOTOR AND DIRECT DRIVE APPARATUS FOR WASHER USING SAME

TECHNICAL FIELD

The present invention relates to a double-stator/double-rotor type motor, in which a nonmagnetic material is provided between inner and outer stators so as to form dual magnetic circuits that are respectively separated for an inner rotor and an outer rotor, and a double stator is disposed between an inner rotor and an outer rotor so as to separably form a magnetic circuit with a shortened magnetic, and a direct drive apparatus for a washing machine using the double-stator/double-rotor type motor.

BACKGROUND ART

A brushless direct-current (BLDC) motor may be classified into a core type (or a radial type) and a coreless type (or an axial type), each having a generally cup-shaped (cylindrical) structure, according to whether or not a stator core exists.

A BLDC motor of a core type structure may be classified into an inner magnet type including a cylindrical stator where coils are wound on a number of protrusions formed on the inner circumferential portion thereof in order to form an electronic magnet structure, and a rotor formed of a cylindrical permanent magnet, and an outer magnet type including a stator where coils are wound up and down on a number of protrusions formed on the outer circumferential portion thereof, and a rotor formed of a cylindrical permanent magnet on the outer portion of which multiple poles are magnetized.

In a conventional outer magnet type BLDC motor, a main path of a magnetic flux forms a magnetic circuit starting from a permanent magnet of a rotor and proceeding toward a stator via an air gap, and proceeding toward the permanent magnet again and in the direction of a yoke.

In a conventional inner magnet type BLDC motor, a plurality of T-shaped core portions on a stator core around which coils are wound, protrude inwards. Also, the inner side ends of the respective core portions form a circle of a predetermined diameter. Also, a rotor is mounted in an inner space of the inner magnet type BLDC motor in which a cylindrical permanent magnet including a rotational shaft is attached, or at the center of the inner magnet type BLDC motor in which a ring-shaped permanent magnet is attached to a cylindrical yoke including a rotational shaft. The inner magnet type BLDC motor rotates in the same manner as that of the outer magnet type BLDC motor.

The magnetic circuit in the above-described core type BLDC motor has a symmetrical structure in the radial direction around the rotational shaft. Accordingly, the core type BLDC motor has less axial vibration noise, and is appropriate for low-speed rotation. Also, since a portion occupied by an air gap with respect to the direction of the magnetic path is extremely small, a high magnetic flux density may be obtained even if a low performance magnet is used or the number of magnets is reduced. As a result, a big torque and a high efficiency may be obtained.

The present applicant proposed a BLDC motor having a single-stator/double-rotor structure in a radial core type in which a stator core may be configured in a full split type, in Korean Patent Laid-open Publication No. 2004-2349. In the Korean Patent Laid-open Publication No. 2004-2349, rotors are respectively disposed at the inner and outer sides of the stator core, to thus form a flow of a magnetic path by a permanent magnet and a yoke that are respectively placed at the inner and outer sides of the stator core. Accordingly, the stator core may be perfectly split, to thus greatly enhance productivity and output of the motor by the individual coil windings.

In addition, in the case of motors having a single-stator/double-rotor structure respectively disclosed in Korean Patent Laid-open Publication Nos. 2008-30667 and 2008-666, coils are toroidally wound on a yoke placed between inner and outer slots formed in an identical number, and thus a high fill factor may not be available, to accordingly limit an efficiency rise.

Figure 1:
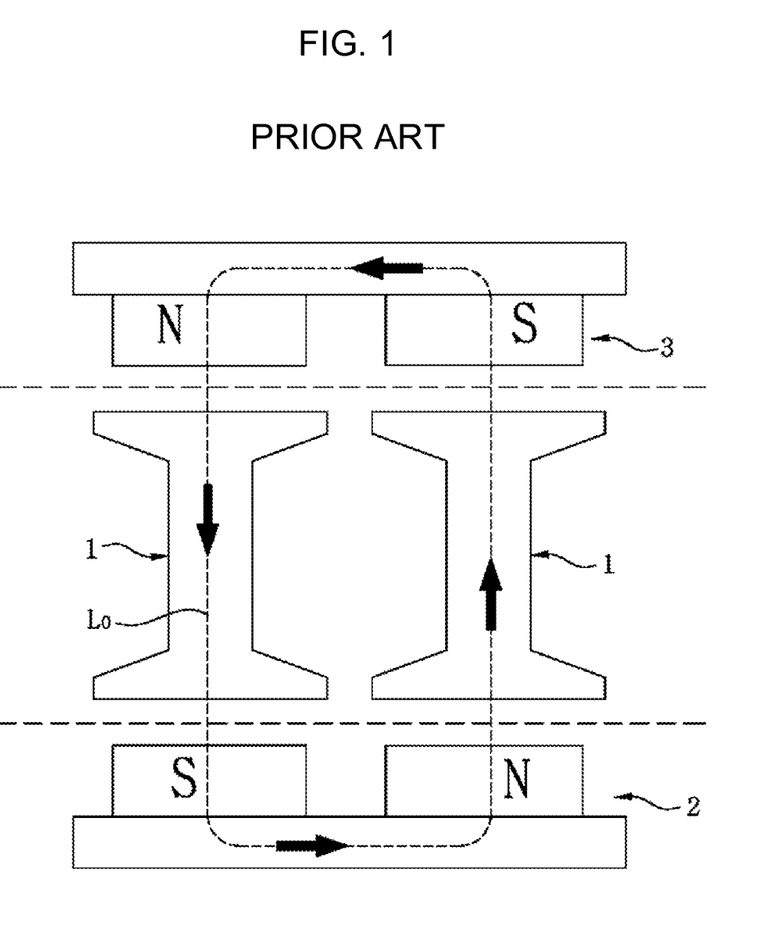
FIG. 1 is a cross-sectional view of a conventional split-core/double-rotor type motor.

Meanwhile, a conventional split-core/double-rotor type motor may be illustrated as shown in FIG. 1. FIG. 1 is a cross-sectional view of a conventional split-core/double-rotor type motor.

In the conventional split-core/double-rotor type motor illustrated in FIG. 1, a split type stator core (that is, a split-core) 1 is located between an inner rotor 2 and an outer rotor 3. The split-core/double-rotor type motor forms a magnetic circuit L0 in which the split type stator core 1 is opposed to the inner rotor 2 and the outer rotor 3 through a preset magnetic gap, respectively. Here, the magnetic circuit L0 forms a single path in which a magnetic flux passes through the split type stator core 1, the inner rotor 2, the split type stator core 1, and the outer rotor 3.

In general, the longer the path of the magnetic circuit may be, magnetoresistance may increase, and thus the loss of a magnetomotive force may become great. Accordingly, the conventional split-core/double-rotor type motor forms the magnetic circuit L0 in which a magnetic flux circulates between the inner rotor 2 and the outer rotor 3 with the split type stator core interposed between the inner rotor 2 and the outer rotor 3. Therefore, when compared with a single-rotor type structure, the conventional split-core/double-rotor type motor has large magnetoresistance to thus cause loss of a magnetomotive force and accordingly have an inefficient structure.

Thus, the conventional split-core/double-rotor type motor needs to reduce magnetoresistance by reducing the path of the magnetic circuit, to prevent the loss of the magnetomotive force.

Meanwhile, the Korean Patent Laid-Open Publication No. 2008-30667 disclosed a motor of a single-stator/double-rotor structure, in which a stator around the inwardly and outwardly protruding serrated saw-teeth of which coils are wound is combined with a double-rotor, to thus reduce cogging torque and torque ripples.

DISCLOSURE

Technical Problem

To solve the above problems or defects, it is an object of the present invention to provide a double-stator/double-rotor type motor, in which a nonmagnetic material is provided between inner and outer stators so as to form dual magnetic circuits that are respectively separated for an inner rotor and an outer rotor, and a double stator is disposed between an inner rotor and an outer rotor so as to separably form a magnetic circuit with a shortened magnetic, and a direct drive apparatus for a washing machine using the double-stator/double-rotor type motor.

The object of the present invention are not limited to the above-mentioned object, and it will be appreciated that the non-described objects and advantages of the invention may be understood by the following description, and may be understood more clearly by the description of the embodiments of the present invention. It will be also easily appreciated that the objects and advantages of the invention may be implemented by elements presented in the patent claims and combinations thereof.

Technical Solution

To accomplish the above and other objects of the present invention, according to an aspect of the present invention, there is provided a double-stator/double-rotor type motor comprising: an inner rotor including a first permanent magnet mounted on an outer circumferential surface of an inner back yoke; an outer rotor including a second permanent magnet mounted on an inner circumferential surface of an outer back yoke; and a stator unit that includes a nonmagnetic material that is capable of magnetic circuits that are independently separated for each of the inner rotor and the outer rotor, in order to face the first permanent magnet with a first air gap, to thereby rotate the inner rotor and in order to face the second permanent magnet with a second air gap, to thereby rotate the outer rotor.

Preferably but not necessarily, the stator unit is placed between the inner rotor and the outer rotor, and comprises: an inner stator and includes a plurality of inner T-shaped teeth that are protruded inwards from an annular body in opposition to the inner rotor, and an inner coil wound on the inner T-shaped teeth; and an outer stator that includes a plurality of outer T-shaped teeth that are protruded outwards from the annular body in opposition to the outer rotor, and an outer coil wound on the outer T-shaped teeth.

Preferably but not necessarily, the stator unit is formed to have different numbers of the inner T-shaped teeth and the outer T-shaped teeth.

Preferably but not necessarily, the stator unit has a split-core structure.

Preferably but not necessarily, the double-stator/double-rotor type motor has an inner-rotor structure and is applied to a drum-type washing machine or a full-automatic washing machine.

Preferably but not necessarily, the double-stator/double-rotor type motor has an outer-rotor structure and is applied to a drum-type washing machine or full-automatic washing machine.

According to another aspect of the present invention, there is also provided a direct drive apparatus for a drum-type washing machine, the direct drive apparatus comprising: an inner rotor including a first permanent magnet mounted on an outer circumferential surface of an inner back yoke; an outer rotor including a second permanent magnet mounted on an inner circumferential surface of an outer back yoke; and a stator unit that includes a nonmagnetic material that is capable of magnetic circuits that are independently separated for each of the inner rotor and the outer rotor, in order to face the first permanent magnet with a first air gap, to thereby rotate the inner rotor and in order to face the second permanent magnet with a second air gap, to thereby rotate the outer rotor; a rotating shaft whose outer circumference is supported to a central portion of the rotors and whose front end is combined with a basket; a first bearing that rotatably supports one end of the rotating shaft; and a second bearing that is provided in the tub to thus rotatably support the other end of the rotating shaft.

Preferably but not necessarily, the first bearing is mounted on a central portion of the stator unit, or on the tub.

Preferably but not necessarily, the stator unit has an inner-rotor structure or an outer-rotor structure and is combined with the rotors.

Preferably but not necessarily, the stator unit comprises: an inner stator that generates a first electromagnetic field to rotate the inner rotor; an outer stator that generates a second electromagnetic field to rotate the outer rotor; and a nonmagnetic material that is disposed between the inner stator and the outer stator, and that separates the magnetic circuits.

Advantageous Effects

As described above, the present invention forms an independent dual magnetic circuit on both the inner and outer portions of a motor although the motor is a double-rotor type motor, thereby reducing a path of the magnetic circuit, and thus reducing magnetoresistance and loss of a magnetomotive force, and thereby minimizing leakage flux, and thus promoting motor efficiency to rise up.

In addition, the present invention enables a rotating shaft to operate in a dual mode by a double rotor, to thus provide an effect capable of driving all rotating shafts connected to the double rotor in a laundry mode of high torque and low speed and driving one of the rotating shafts connected to the double rotor in a dehydration mode of low torque and high speed.

In addition, the present invention may be applied to an inner cylinder or a drum driving unit of a full-automatic washing machine or a cover-integrated type or a slim type drum-type washing machine.

In addition, the present invention uses a set of molds as inner and outer core molds, to thus reduce time and cost required for preparation of the mold.

BEST MODE

The objects, features and advantages of the invention will become apparent through the exemplary embodiments that are illustrated in the accompanying drawings and detailed in the following description. Accordingly, the inventive technological concept can be made by those skilled in the art without departing from the spirit and scope of the invention.

Prior to illustrating an embodiment of the present invention, a double-stator/double-rotor type motor according to the present invention is implemented into a case that an integral type stator is disposed between inner and outer rotors.

The double-stator/double-rotor type motor according to the present invention is configured to have a structure that an integral type stator is disposed between inner and outer rotors. However, since an independent magnetic circuit is formed for each of the inner and outer rotors, the double-stator/double-rotor type motor can provide a double-stator function opposed to each of the inner and outer rotors. In other words, the double-stator/double-rotor type motor according to the present invention forms an inner magnetic circuit between the inner rotor and an inner side of the stator (hereinafter referred to as an "inner stator"), and an outer magnetic circuit between the outer rotor and an outer side of the stator (hereinafter referred to as an "outer stator"). The inner and outer magnetic circuits are not combined to form a single magnetic circuit, but are formed into the independently separated magnetic circuits. In this case, the stator forms an independent magnetic circuit by placing a nonmagnetic material in the inside of an annular body in order to form a magnetic circuit that is concentrically formed and separated around a central portion of the annular body, and preventing formation of a magnetic path that is linked between inner and outer magnetic circuits.

The double-stator/double-rotor type motor according to the present invention may be implemented into a structure that output torque of each rotor may be generated to then be combined with a single rotating shaft, or to then be combined with double rotating shafts that are connected to the respective rotors. Accordingly, the double-stator/double-rotor type motor according to the present invention may be appropriate even in the case that output torque may be implemented in a double mode (for example, all rotating shafts connected to the double rotor are driven in a laundry mode of high torque and low speed and one of the rotating shafts connected to the double rotor is driven in a dehydration mode of low torque and high speed, in a washing machine).

In general, a magnetic circuit of a motor increases magnetoresistance as a magnetic path becomes longer, and accordingly loss of a magnetomotive force becomes larger. However, the double-stator/double-rotor type motor according to the present invention forms an independent magnetic circuit for the respective inner and outer portions of the motor, to thereby prevent efficiency of a magnetomotive force from being lowered due to a lengthily formed magnetic path as a disadvantage of a double type motor (for example, a double-rotor type motor), as well as provide a large amount of output torque and a double rotating shaft mode as an advantage of the double type motor.

Hereinbelow, the double-stator/double-rotor type motor according to the present invention will be described in detail with reference to the accompanying drawings.

Figure 2:
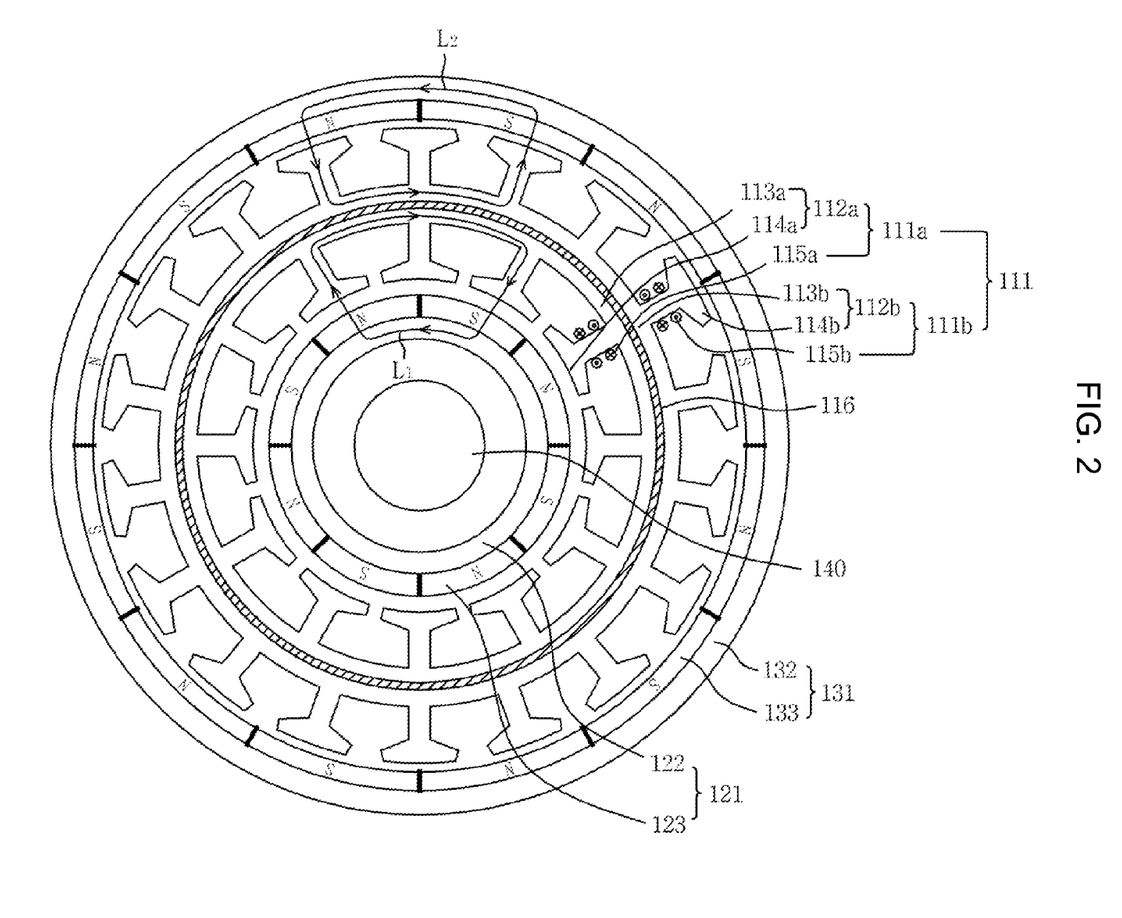
FIG. 2 is a cross-sectional view of a double-stator/double-rotor type motor according to the present invention.

FIG. 2 is a cross-sectional view of a double-stator/double-rotor type motor according to an embodiment of the present invention.

As shown in FIG. 2, the double-stator/double-rotor type motor 100 according to the embodiment of the present invention includes an inner stator 111a, an outer stator 111b, an inner rotor 121, and an outer rotor 131. Here, for the convenience of explanation, the inner stator 111a and the outer stator 111b are collectively referred to as a "stator unit 111." In this case, the stator unit 111 is disposed between the inner rotor 121 and the outer rotor 131, and is divided into the inner stator 111a and the outer stator 111b by a nonmagnetic material 116 that magnetically separates the stator unit into inner and outer portions of the stator unit 111.

First, the inner stator 111a includes an inner body 113a that is formed in an annular form in the inside of the nonmagnetic material 116, a plurality of inner T-shaped teeth 114a that are opposed to the inner rotor 121 and protruded inwards from the inner body 113a, and a plurality of inner coils 115a wound on the inner teeth 114a. Here, the inner body 113a and the inner teeth 114a will be collectively referred to as an "inner stator core 112a." In addition, the outer stator 111b includes an outer body 113b that is formed in an annular form in the outside of the nonmagnetic material 116, a plurality of outer T-shaped teeth 114b that are opposed to the outer rotor 131 and protruded outwards from the outer body 113b, and a plurality of outer coils 115b wound on the outer teeth 114b. Here, the outer body 113b and the outer teeth 114b will be collectively referred to as an "outer stator core 112b." Here, the number of the inner teeth 114a is twelve (12) and the number of the outer teeth 114b is eighteen (18).

Here, an integral type stator core (for example, a whole-core) is described as the inner stator core 22a, but even a split type stator core (for example, a split-core) may be applied to the inner stator core 22a. In other words, in the case of the split type stator core, as disclosed in Korean Patent Registration Nos. 663641 or 930011, an annular integral type stator is obtained by integrally forming an insulating bobbin surrounding an inner split core, winding coils around the outer circumference of the bobbin so as to be assembled in an annular form, and molding the outer surface of the bobbin with a thermosetting resin by an insert molding method. A detailed description of the split type stator core will be omitted since those skilled in the art can easily understand the split type stator core. Also, in the case of employing the split type stator core structure, it is possible to maximize a fill factor and to perform alignment winding, to thus increase the efficiency of the motor.

Meanwhile, the nonmagnetic material 116 plays a role of substantially dividing the integral type stator unit 111 into the inner stator 111a and the outer stator 111b, to thus implement a double stator structure. Accordingly, independently separated magnetic circuits that are not connected with each other for the inner stator 111a and the outer stator 111b may be formed.

More specifically, an inner magnetic circuit L1 is formed between the inner stator 111a and the inner rotor 121. The inner magnetic circuit L1 is formed by the N-pole inner magnet 123, the inner T-shaped tooth 114a opposite the N-pole inner magnet 123, the inner body 113a, the inner T-shaped tooth 114a opposite the S-pole inner magnet 123, the S-pole inner magnet 123 adjacent the N-pole inner magnet 123, and the inner back yoke 122. In addition, an outer magnetic circuit L2 is formed between the outer stator 111b and the outer rotor 131. The outer magnetic circuit L2 is formed by the N-pole outer magnet 133, the outer T-shaped tooth 114b opposite the N-pole outer magnet 133, the outer body 113b, the outer T-shaped tooth 114b opposite the S-pole inner magnet 133, the S-pole inner magnet 133 adjacent the N-pole outer magnet 133, and the outer back yoke 132.

Here, the present invention has been described with respect to the case that the inner rotor 121 and the outer rotor 131 are combined and rotated with a single rotating shaft, but one skilled in the art can easily understand that the inner rotor 121 and the outer rotor 131 may be combined and rotated with independent rotating shafts, respectively. In particular, in the case that the inner rotor 121 and the outer rotor 131 are combined and rotated with first and second rotating shafts, respectively, output torque from both the inner rotor 121 and the outer rotor 131 may be used during performing a laundry of high torque and low speed, and output torque from either the inner rotor 121 or the outer rotor 131 may be used during performing a dehydration of low torque and high speed. As an example, the above-described double rotating shaft structure may be applied to a full-automatic washing machine, in which a pulsator is connected with a first rotating shaft connected with the inner rotor 121 and an inner cylinder is connected with a second rotating shaft connected with the outer rotor 131.

An inner coil 115a is an individual coil of three phases (such as U-phase, V-phase, and W-phase) wound on the respective inner T-shaped teeth 114a, and wired in a three-phase star or three-phase delta wiring method. The inner coil 115a is energized to thus generate torque by the relationship with the inner magnet 123 and to thereby make the inner rotor 121 rotate in a predetermined direction. In addition, an outer coil 115b is an individual coil of three phases (such as U-phase, V-phase, and W-phase) wound on outer T-shaped teeth 114b, and wired in a three-phase star or three-phase delta wiring method. The outer coil 115b is energized to thus generate torque by the relationship with the outer magnet 133 and to thereby make the outer rotor 131 rotate in a predetermined direction.

For the convenience of description, the states where the inner coil 115a and the outer coil 115b are wound are not specifically shown in FIG. 2. That is to say, it is obvious that three-phase (U-phase, V-phase, and W-phase) coils are actually wound on the inner stator 111a and the outer stator 111b. Additionally, copper (Cu) is typically used as a material of the inner coil 115a and the outer coil 115b, but aluminum (Al) with a specific weight of ⅓ and a relatively cheap price when compared with copper may be used as the material of the inner coil 115a and the outer coil 115b, to reduce the weight of the motor. In general, aluminum encounters an oxidation problem and thus it is difficult to apply aluminum to the motor coil, but when aluminum is used as the motor coil, the outside of a stator core assembly around which coils are wound is coated by using a thermosetting resin in order to solve the oxidation problem.

Meanwhile, the double-stator/double-rotor type motor 100 according to the present invention may be applied to full-automatic washing machines as well as drum-type washing machines, but only the case that the present invention is applied to the drum-type washing machine will be described in detail (see FIGS. 3 to 6). The double-stator/double-rotor type motor 100 according to the present invention may be driven by applying electric power to both stators during performing laundry, and may be driven by applying electric power to one of stators during performing dehydration. In particular, only one stator may be driven during performing dehydration, to thus reduce power consumption. In this case, it is not necessary to perform a field weakening control, to thus enhance efficiency.

Hereinbelow, a direct drive apparatus for a drum-type washing machine will be described in detail with reference to FIGS. 3 to 6, in which the direct drive apparatus is provided in a tub of the drum-type washing machine to drive a basket.

Figure 3:
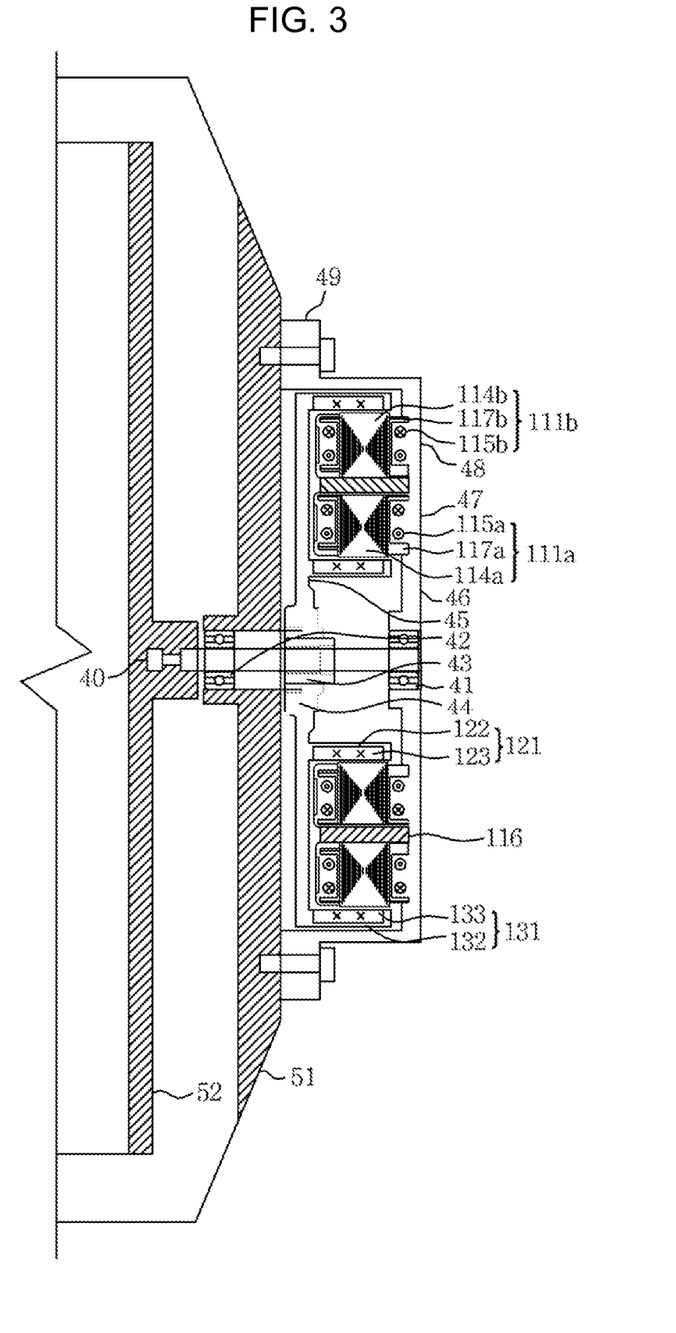
FIG. 3 is an axial cross-sectional view showing a double-stator/double-rotor type motor of a cover integrated structure applied to a drum-type washing machine, according to an embodiment of the present invention.

FIG. 3 is an axial cross-sectional view showing a double-stator/double-rotor type motor of a cover integrated structure applied to a drum-type washing machine, according to an embodiment of the present invention.

The double-stator/double-rotor type motor 100 according to the present invention, employ a cover integrated structure as an inner-rotor structure (or an outer-stator structure) in which the inner rotor 121 and the outer rotor 131 are disposed at the inner side of the motor (that is, at the side of a tub of the drum-type washing machine) with respect to the stator unit 111 in the axial cross-section, and represent a structure of blocking noise of the rotors that rotates in the inside of the motor. The double-stator/double-rotor type motor 100 according to the present invention, may be disposed on a rear surface of a tub 51 in a built-in type small-size or medium-size drum-type washing machine, as an example, and used to rotationally drive a basket 52 that is located in direct connection in the inside of the tub 51 in a forward/reverse direction. Also, the double-stator/double-rotor type motor 100 according to the present invention may be applied to other equipment other than the washing machines.

Hereinbelow, the drum-type washing machine employing the double-stator/double-rotor type motor according to the present invention will be described in detail.

As shown in FIG. 3, the inner stator 111a is molded in an annular form by integrally combining an inner stator core 112a with an annular inner stator support 47, and the outer stator 111b is molded in an annular form by integrally combining an outer stator core 112b with an annular outer stator support 48. Here, the inner and the outer stator supports 47 and 48 are combined with the first bearing 41 through an inner extension portion 46 that is extended inwards from the inner and the outer stator supports 47 and 48. As described above, the rotating shaft 40 is rotatably supported by the first bearing 41.

In addition, the inner stator core 112a is integrally formed by the inner stator support 47 that is manufactured by winding the inner coil 115a on the outer circumference of a first bobbin 117a and then insert molding the coil-wound first bobbin using a thermosetting resin, and the outer stator core 112b is integrally formed by the outer stator support 48 that is manufactured by winding the outer coil 115b on the outer circumference of a second bobbin 117b and then insert molding the coil-wound second bobbin using a thermosetting resin. Here, the outer circumferential portion of the outer stator support 48 is extended forward and is fixed on the tub 51 of the washing machine by an outer extension portion 49 forming an annular cover. As described above, the stator unit 111 according to the present invention does not have any additional cover and thus may be formed in a slim structure, to thereby promote a low noise structure desirable for a built-in type washing machine.

In particular, the nonmagnetic material 116 is provided between the inner stator 111a and the outer stator 111b, to thus form the independently separated magnetic circuits with respect to each other between the inner stator 111a and the inner rotor 121 and between the outer stator 111b and the outer rotor 131.

Next, the inner rotor 121 has a predetermined magnetic gap with respect to the inner stator 111a and a number of inner magnets 123 are disposed in an annular form in the inner back yoke 122. In addition, the outer rotor 131 has a predetermined magnetic gap with respect to the outer stator 111b and a number of outer magnets 133 are disposed in an annular form in the outer back yoke 132. Here, the inner rotor 121 and the outer rotor 131 are connected to a rotor support 45, and combined with a bushing 43 by a bushing support 44 that is extended to the rotor support 45, to accordingly transfer a rotating force to the rotating shaft 40.

Here, the rotating shaft 40 becomes a reference that the stator unit 111, the inner rotor 121, and the outer rotor 131 may be assembled in one. Accordingly, the inner rotor 121 and the outer rotor 131 may prevent vibration noise due to the non-uniform magnetic gap during rotation, by uniformly setting a magnetic gap between the inner stator 111a and the outer stator 111b.

The rotating shaft 40 is combined with the inner rotor 121 and the outer rotor 131 through an involute serration bushing 43 in the center of the inner rotor 121 and the outer rotor 131, and one end of the rotating shaft 40 is rotatably supported through the first bearing 41 that is integrally installed in the inner extension portion 46, and the other end of the rotating shaft 40 is rotatably supported through the second bearing 42 that is integrally installed in the tub 51.

In addition, the basket 52 that is rotatably supported in the inside of the tub 51 of the washing machine and that accommodates laundry washes is combined on the leading end of the rotating shaft 40, and thus the basket 52 is rotationally driven in a forward/reverse direction depending on the behavior of the motor 100.

Figure 4:
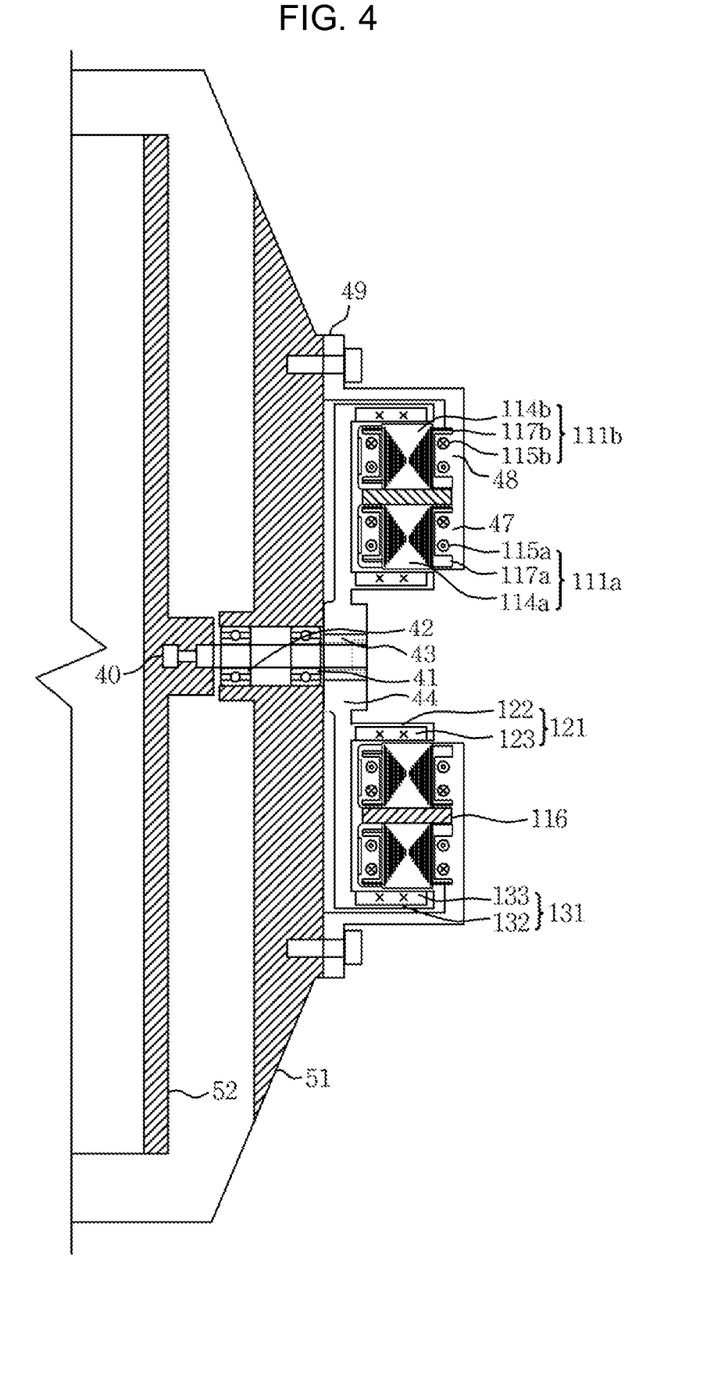
FIG. 4 is an axial cross-sectional view showing a double-stator/double-rotor type motor of a cover integrated structure applied to a drum-type washing machine, according to a modified embodiment of the present invention.

FIG. 4 is an axial cross-sectional view showing a double-stator/double-rotor type motor of a cover integrated structure applied to a drum-type washing machine, according to a modified embodiment of the present invention.

The double-stator/double-rotor type motor 100 shown in FIG. 4 is a kind of a cover integrated structure as an inner-rotor structure (or an outer-stator structure) in which the inner rotor 121 and the outer rotor 131 are disposed at the inner side of the motor as shown in FIG. 3, but has an open type structure in which both the first bearing 41 and the second bearing 42 are placed in the tub 51 to thus rotatably support the rotating shaft 40, and the inner extension portion 46 extended from the stator supports 47 and 48 is removed, to thus confirm the behavior of the rotor support 45 externally. This enables the behavior of the rotor support 45 to be confirmed externally and thus the state of the inner rotor 121 and the outer rotor 131 to be confirmed although the inner rotor 121 and the outer rotor 131 are located in the inside of the motor as an outer-stator structure.

Meanwhile, the specific description of the stator unit 111, and the inner rotor 121 and the outer rotor 131 are redundant from the foregoing description of FIG. 3 and thus will be briefly described. In other words, the inner stator 111a is molded in an annular form by integrally combining an inner stator core 112a where the inner coil 115a is wound on the outer circumference of a first bobbin 117a with an inner stator support 47, and the outer stator 111b is molded in an annular form by integrally combining an outer stator core 112b where the outer coil 115b is wound on the outer circumference of a second bobbin 117b with an outer stator support 48. In addition, a number of inner magnets 123 are disposed in an annular form in the inside and outside of the inner back yoke 132 of the inner rotor 121. The inner rotor 121 is supported and rotated by the rotor support 45 connected to the rotating shaft 40. In addition, a number of outer magnets 133 are disposed in an annular form in the inside and outside of the outer back yoke 132 of the outer rotor 131. The outer rotor 131 is supported and rotated by the rotor support 45 connected to the rotating shaft 40.

Figure 5:
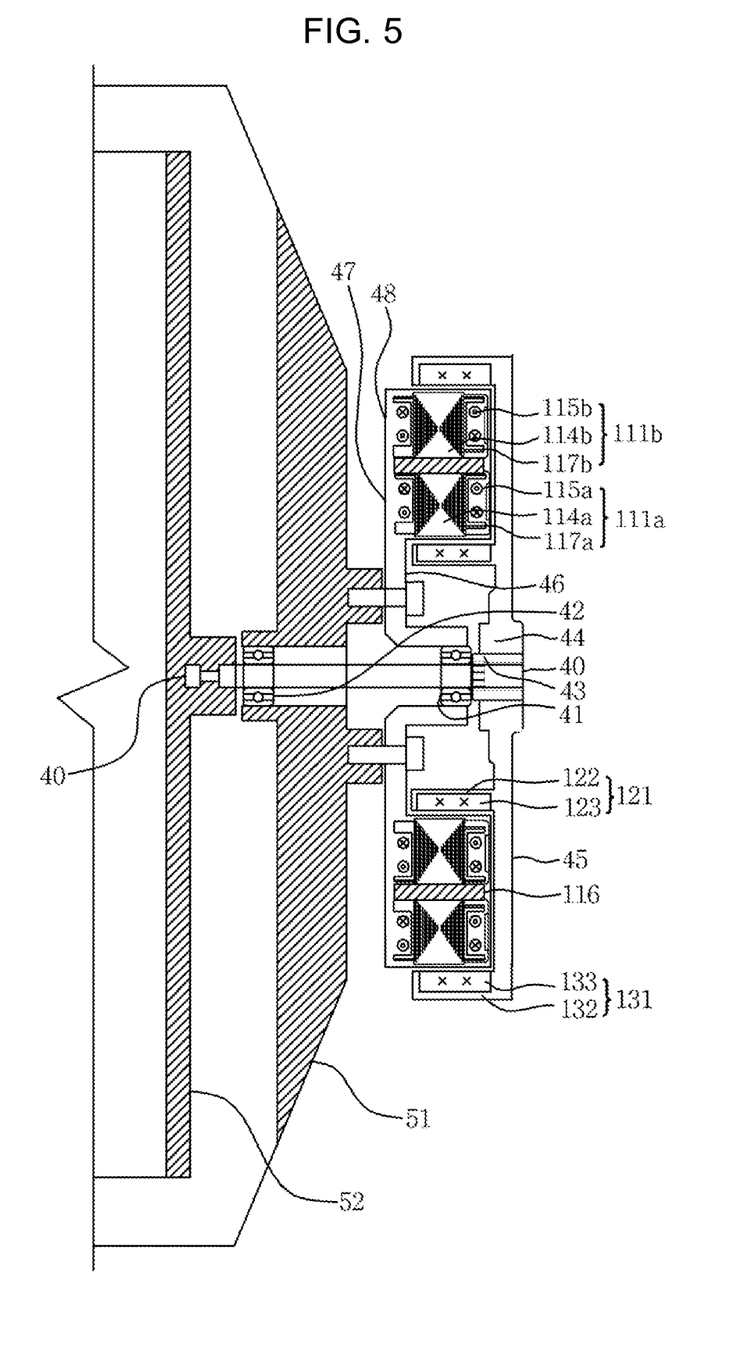
FIG. 5 is an axial cross-sectional view showing a double-stator/double-rotor type motor of a slim type structure applied to a drum-type washing machine, according to an embodiment of the present invention.

FIG. 5 is an axial cross-sectional view showing a double-stator/double-rotor type motor of a slim type structure applied to a drum-type washing machine, according to an embodiment of the present invention.

The double-stator/double-rotor type motor 100 according to the present invention, employ a slim type structure as an outer-rotor structure (or an inner-stator structure) in which the inner rotor 121 and the outer rotor 131 are disposed at the outer side (that is, at the opposite side of the tub of the drum-type washing machine) with respect to the stator unit 111 in the axial cross-section.

Figure 6:
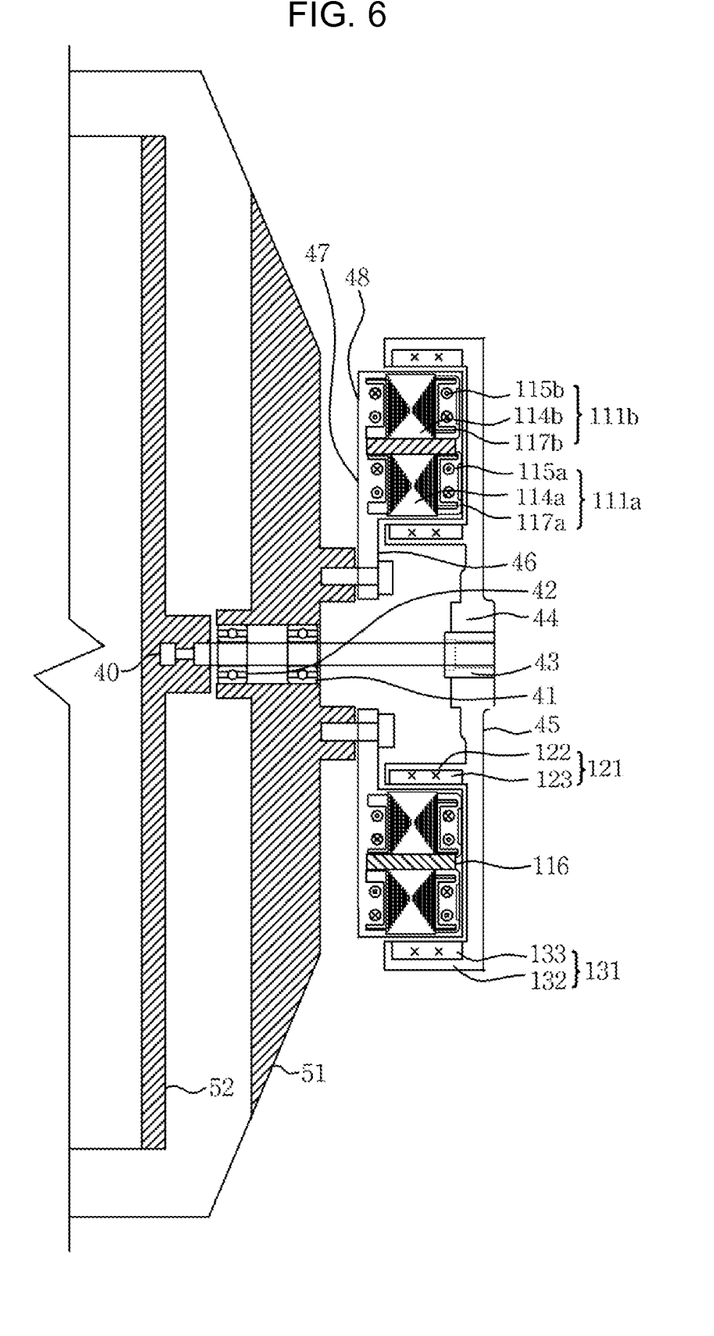
FIG. 6 is an axial cross-sectional view showing a double-stator/double-rotor type motor of a slim type structure applied to a drum-type washing machine, according to a modified embodiment of the present invention.

As shown in FIG. 6, the double-stator/double-rotor type motor 100 according to the first embodiment of the present invention has a slim type structure, in which a bushing 43 that is combined with the rotating shaft 40, and an inner extension portion 46 that is coupled to the tub 51 are disposed at the central portion of the motor, to thus minimize and shorten the axial length (that is, the thickness) of the motor, and minimize vibration generated during rotation of the inner rotor 121 and the outer rotor 131. In other words, the inner extension portion 46 is bent once inwardly and extended, in order to block the axial length of the motor from increasing, and accordingly is disposed in the coaxial direction with respect to the bushing 43 whose leading end is combined with the rotating shaft 40 of the inner rotor 121 and the outer rotor 131.

Moreover, the double-stator/double-rotor type motor 100 may undergo stress-induced deformation and damage since the tub 51 is forced by the electromagnetic force when the power is applied to the motor in the case that the inner extension portion 46 is tightened with the tub 51 by using bolts. However, the first bearing 41 and the second bearing 42 may support the rotating shaft 40, to thus reduce deformation and damage due to the force applied to the tub 51 and may prevent distortion to thus disperse and support loads that may occur during rotation.

In addition, the double-stator/double-rotor type motor 100 may enhance the structural stability and increase durability against vibration of the washing machine, in which the first bearing 41 is placed in the inner extension portion 46 and the second bearing 42 is placed in the tub 51, to thus be spaced by a predetermined interval between the first bearings 41 and the second bearing 42. This means that the drum-type washing machine or the full-automatic washing machine may be implemented appropriately for the low vibration and low noise structure.

Here, the detailed description of the stator unit 111, the inner rotor 121, and the outer rotor 131 are redundant from the foregoing description of FIGS. 3 and 4, and thus will be omitted.

FIG. 6 is an axial cross-sectional view showing a double-stator/double-rotor type motor of a slim type structure applied to a drum-type washing machine, according to a modified embodiment of the present invention.

The double-stator/double-rotor type motor 100 shown in FIG. 6 employs a slim type structure as an outer-rotor structure (or an inner-stator structure) in which the inner rotor 121 and the outer rotor 131 are disposed at the outer side of the motor, as shown in FIG. 5, but rotatably supports the rotatable shaft 40 in which both the first bearing 41 and the second bearing 42 are placed in the tub 51.

Meanwhile, since the components of the double-stator/double-rotor type motor shown in FIG. 6 are the same as those of the FIG. 5, the detailed description thereof will be omitted. Likewise, the detailed description of the stator unit 111, the inner rotor 121 and the outer rotor 131 will be omitted.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

Industrial Applicability

The present invention can be applied to an inner cylinder or a drum driving apparatus for full-automatic washing machines, or cover integrated or slim type drum-type washing machines.

The invention claimed is:

1. A double-stator/double-rotor type motor comprising:
an inner rotor including a first permanent magnet mounted on an outer circumferential surface of an inner back yoke;

an outer rotor including a second permanent magnet mounted on an inner circumferential surface of an outer back yoke; and a stator unit that faces the first permanent magnet with a first air gap, to thereby rotate the inner rotor and faces the second permanent magnet with a second air gap, to thereby rotate the outer rotor, wherein the stator unit is placed between the inner rotor and the outer rotor;

wherein the stator unit comprises:

an inner stator that includes a plurality of inner T-shaped teeth protruded inwards from an annular inner body in opposition to the inner rotor, and an inner coil wound on the inner T-shaped teeth;

an outer stator that includes a plurality of outer T-shaped teeth protruded outwards from an annular outer body in opposition to the outer rotor, and an outer coil wound on the outer T-shaped teeth;

a nonmagnetic material disposed between the annular inner body of the inner stator and the annular outer body of the outer stator to create independent and separate magnetic circuits for each of the inner rotor and the outer rotor;

stator supports that are composed of an inner stator support and an outer stator support, and that integrally combine the inner stator, the outer stator and the nonmagnetic material;

an outer extension portion that extends outward from the outer stator support; and an inner extension portion that extends inwards from the inner stator support;

wherein the stator supports, the outer extension portion and the inner extension portion are integrally combined as a single piece to form an annular cover covering the inner and outer rotors.

2. The double-stator/double-rotor type motor according to claim 1, wherein the stator unit is formed to have different numbers of the inner T-shaped teeth and the outer T-shaped teeth.

3. The double-stator/double-rotor type motor according to claim 1, wherein the stator unit has a split-core structure.

4. A double-stator/double-rotor type motor comprising:

an inner rotor including a first permanent magnet mounted on an outer circumferential surface of an inner back yoke;

an outer rotor including a second permanent magnet mounted on an inner circumferential surface of an outer back yoke; and a stator unit that faces the first permanent magnet with a first air gap, to thereby rotate the inner rotor and faces the second permanent magnet with a second air gap, to thereby rotate the outer rotor, wherein the stator unit is placed between the inner rotor and the outer rotor;

wherein the stator unit comprises:

an inner stator that includes a plurality of inner T-shaped teeth protruded inwards from an annular inner body in opposition to the inner rotor, and an inner coil wound on the inner T-shaped teeth;

an outer stator that includes a plurality of outer T-shaped teeth protruded outwards from an annular outer body in opposition to the outer rotor, and an outer coil wound on the outer T-shaped teeth;

a nonmagnetic material disposed between the annular inner body of the inner stator and the annular outer body of the outer stator to create independent and separate magnetic circuits for each of the inner rotor and the outer rotor;

stator supports that are composed of an inner stator support and an outer stator support, and that integrally combine the inner stator, the outer stator and the nonmagnetic material; and an outer extension portion that extends outward from the outer stator support;

wherein the stator supports and the outer extension portion are integrally combined as a single piece to form an annular cover having an opening at a center thereof, to thereby cover the inner and outer rotors and be able to confirm behavior of the rotor support from outside the motor.

5. A direct drive apparatus for a drum-type washing machine, the direct drive apparatus comprising:

an inner rotor including a first permanent magnet mounted on an outer circumferential surface of an inner back yoke;

an outer rotor including a second permanent magnet mounted on an inner circumferential surface of an outer back yoke; and a stator unit that faces the first permanent magnet with a first air gap, to thereby rotate the inner rotor and faces the second permanent magnet with a second air gap, to thereby rotate the outer rotor;

a rotating shaft whose outer circumference is supported to a central portion of the rotors and whose front end is combined with a basket;

a first bearing that rotatably supports one end of the rotating shaft; and a second bearing that is provided in the tub to thus rotatably support the other end of the rotating shaft, wherein the stator unit is placed between the inner rotor and the outer rotor;

wherein the stator unit comprises:

an inner stator that includes a plurality of inner T-shaped teeth protruded inwards from an annular inner body in opposition to the inner rotor, and an inner coil wound on the inner T-shaped teeth;

an outer stator that includes a plurality of outer T-shaped teeth protruded outwards from an annular outer body in opposition to the outer rotor, and an outer coil wound on the outer T-shaped teeth;

a nonmagnetic material disposed between the annular inner body of the inner stator and the annular outer body of the outer stator to create independent and separate magnetic circuits for each of the inner rotor and the outer rotor;

stator supports that are composed of an inner stator support and an outer stator support, and that integrally combine the inner stator, the outer stator and the nonmagnetic material;

an outer extension portion that extends outward from the outer stator support; and an inner extension portion that extends inwards from the inner stator support;

wherein the stator supports, the outer extension portion and the inner extension portion are integrally combined as a single piece to form an annular cover covering the inner and outer rotors.

6. The direct drive apparatus for a drum-type washing machine according to claim 5, wherein the first bearing is mounted on a central portion of the stator unit, or on the tub.

* * * * *